United States Patent [19]
Fader et al.

[11] 3,857,276
[45] Dec. 31, 1974

[54] SHOCK ABSORBER TESTING APPARATUS

[75] Inventors: John H. Fader; Johan H. Keijzer, both of Hasselt; Reinhart A. Versehoore, Wondelgem, all of Belgium

[73] Assignee: Monroe Belgium N.V., Sint-Truiden, Belgium

[22] Filed: Dec. 8, 1972

[21] Appl. No.: 313,459

Related U.S. Application Data

[63] Continuation of Ser. No. 20,932, March 19, 1970, abandoned, which is a continuation-in-part of Ser. No. 876,546, Nov. 13, 1969, abandoned.

[52] U.S. Cl. ................................................. 73/11
[51] Int. Cl. ........................................ G01m 17/04
[58] Field of Search ......................................... 73/11

[56] References Cited
UNITED STATES PATENTS

| | | | |
|---|---|---|---|
| 1,891,613 | 12/1932 | Widney | 73/11 X |
| 2,799,158 | 7/1957 | Federspiel | 73/11 X |
| 2,934,940 | 5/1960 | Beissbarth | 73/11 |
| 3,164,003 | 1/1965 | MacMillan | 73/11 |
| 3,187,554 | 6/1965 | Lackman | 73/11 |
| 3,313,142 | 4/1967 | Lackman | 73/11 |
| 3,383,909 | 5/1968 | Percy | 73/11 |
| 3,456,489 | 7/1969 | Levenson | 73/11 |

*Primary Examiner*—Charles A. Ruehl
*Attorney, Agent, or Firm*—Harness, Dickey & Pierce

[57] ABSTRACT

A method and apparatus for testing vehicular shock absorbers in situ upon a vehicle having a sprung portion and supporting wheels, the apparatus comprising a support structure, elevating means on the structure engageable with one supporting wheel of a vehicle and adapted to exert an upwardly directed force thereagainst and thereby raise the wheel and that portion of the vehicle supported thereby from a relatively non-elevated position to a relatively elevated position, means for permitting the elevated wheel and portion of the vehicle supported thereon to fall from the elevated position to the non-elevated position and means for sensing the velocity and/or acceleration of one of the portions of the vehicle with respect to some preselected reference surface during the fall thereof and thereby determine the rebound and compression characteristics of the associated shock absorber.

17 Claims, 5 Drawing Figures

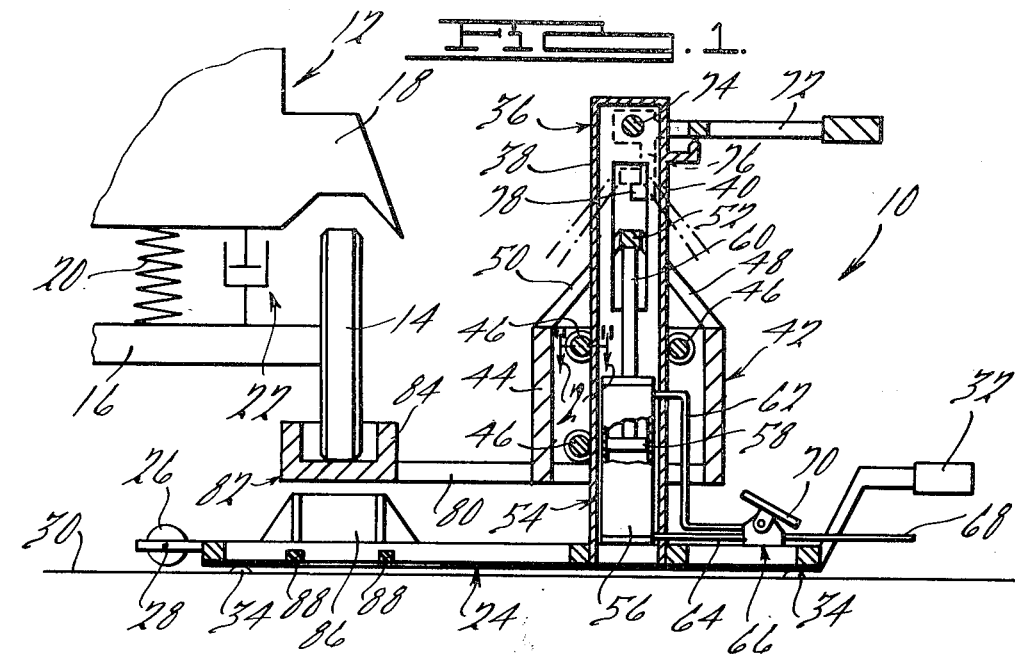
FIG. 1.
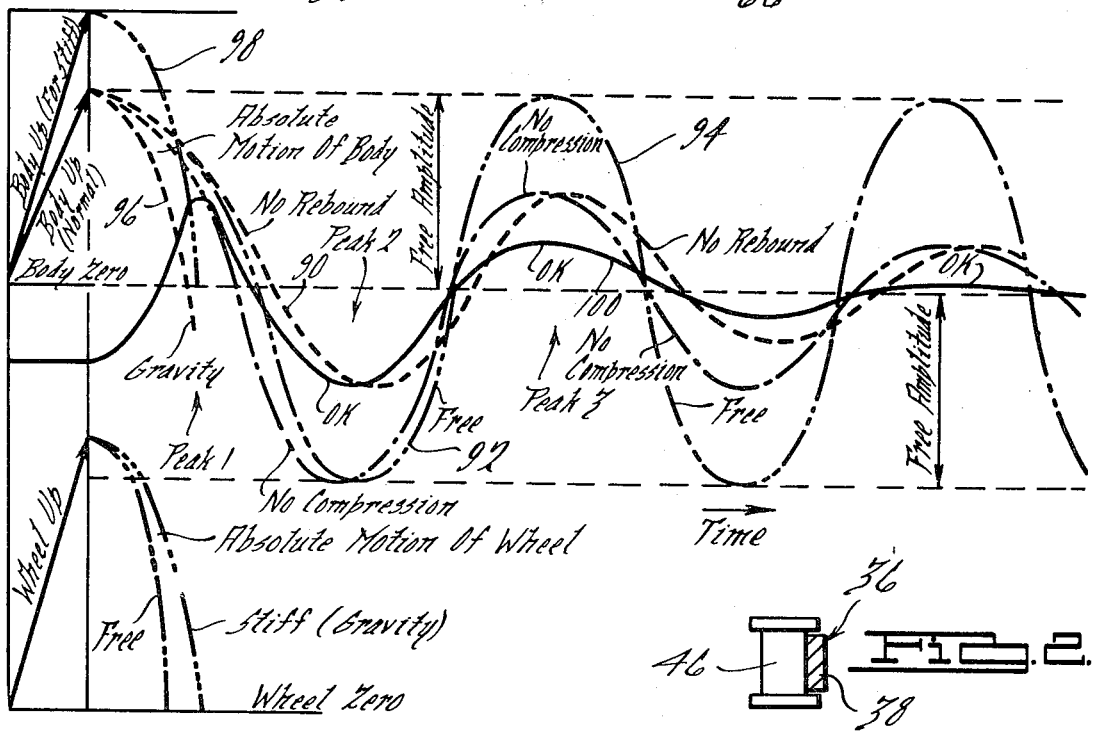
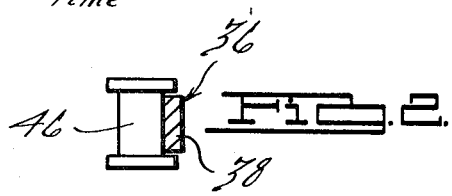
FIG. 2.
FIG. 5.

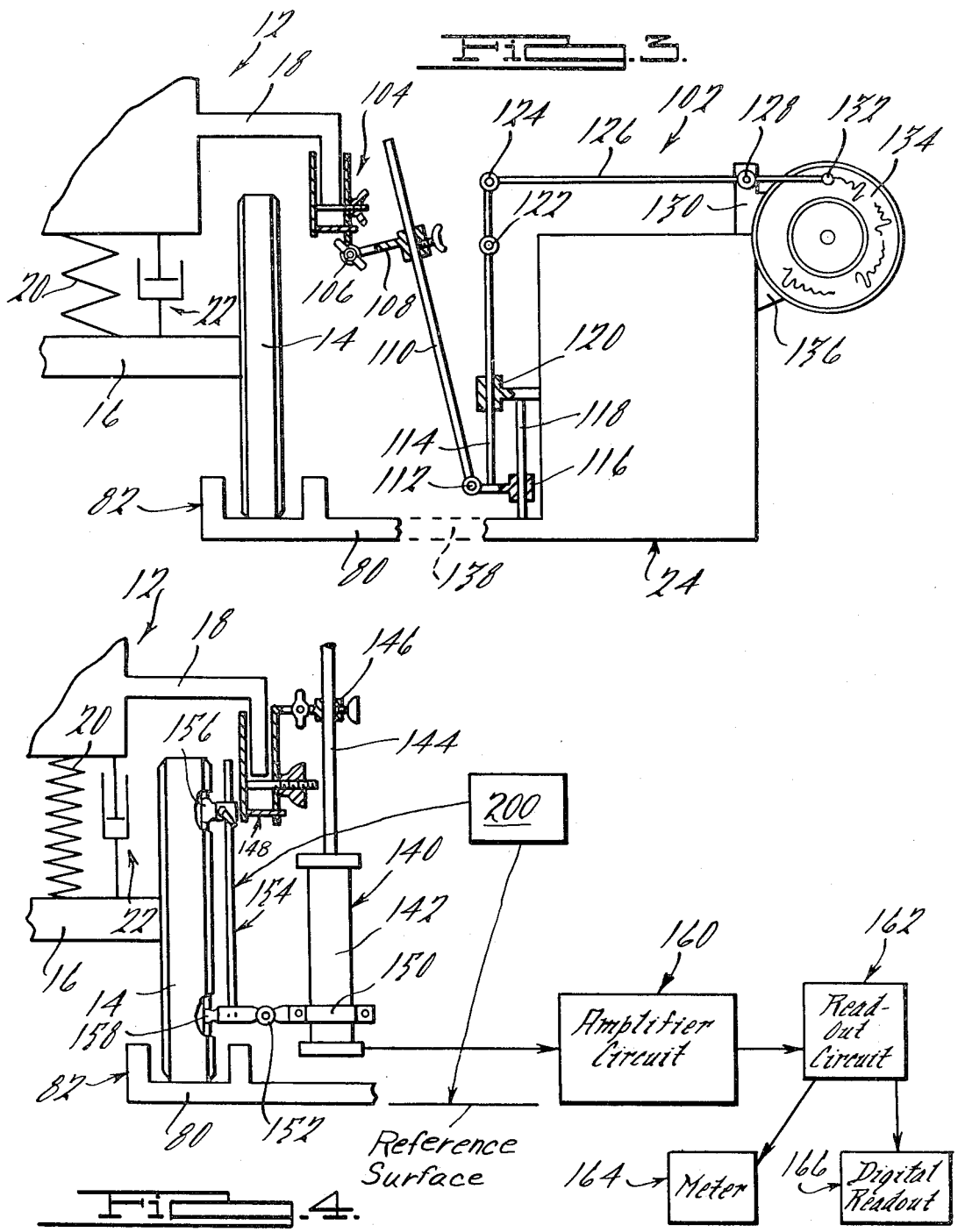

3,857,276

SHOCK ABSORBER TESTING APPARATUS

RELATED APPLICATIONS

This is a continuation application of U.S. Ser. No. 20,932, filed Mar. 18, 1970 (now abandoned), which is in turn a continuation-in-part of application of U.S. Ser. No. 876,546, filed Nov. 13, 1969 (now abandoned).

BACKGROUND OF THE INVENTION

Generally speaking, the present invention relates to a shock absorber testing apparatus which is adapted to test vehicular shock absorbers in situ upon the associated vehicle, thereby minimizing to the extreme the time and effort required for shock absorber diagnosis. The shock absorber testing apparatus of the present invention generally functions to engage and elevate a vehicle wheel associated with the shock absorber being tested, thereby effecting a compression of the associated suspension spring and elevation of a portion of the vehicle body associated with said wheel. Once the vehicle wheel and body portion have been properly elevated, a release mechanism is actuated which permits the wheel and body portions to fall, with the relative movement between the vehicle portion and some reference surface being sensed and recorded for subsequent analysis. Through proper evaluation of the recorded depiction or data defining the relative movement between the vehicle wheel and associated body portion, the compression control characteristics of the shock absorber being tested, as well as both the high speed and low speed rebound control characteristics thereof, may be accurately determined, and the testing operator may thereafter use the recorded information to compare the operational characteristics of the shock absorber with pre-recorded "ideal" data obtained from testing similar shock absorbers having known satisfactory characteristics.

SUMMARY OF THE INVENTION

This invention relates generally to improvements in shock absorber testing apparatus and, more particularly, to a new and improved shock absorber testing apparatus which is adapted to determine the rebound and compression control characteristics of shock absorbers while they are in situ upon the associated vehicle.

It is accordingly a general object of the present invention to provide a new and improved shock absorber testing apparatus.

It is a more particular object of the present invention to provide a new and improved shock absorber testing apparatus for testing shock absorbers without removing the same from the associated vehicle.

It is another object of the present invention to provide a shock absorber testing apparatus of the above character which is capable of determining the compression control characteristics of a shock absorber, as well as determining both the high speed and low speed rebound control characteristics thereof.

It is a further object of the present invention to provide a shock absorber testing apparatus of the above character which is of a relatively simple design, is economical to manufacture, is extremely portable, and which may be operatively associated with various types of sensing and recording devices for providing a visual indication of the operational characteristics of shock absorbers being tested thereby.

It is yet another object of the present invention to provide a new and improved shock absorber testing apparatus which determines the compression and rebound control characteristics of a shock absorber by sensing the velocity and/or acceleration between the wheel associated with the shock absorber being tested and some predetermined reference point.

Other objects and advantages of the present invention will become apparent from the following detailed description taken in conjunction with the accompanying drawings.

BRIEF DESCRIPTION OF THE DRAWINGS

FIG. 1 is a side elevational view of an exemplary embodiment of the shock absorber testing apparatus of the present invention, as shown in operative association with a schematic representation of a portion of an automotive vehicle;

FIG. 2 is a cross-sectional view taken substantially along the line 2—2 of FIG. 1;

FIG. 3 is a side elevational view of one embodiment of the means for sensing and recording relative movement between the wheel and vehicle body of a vehicle having a shock absorber being tested in accordance with the present invention;

FIG. 4 is another embodiment of a means for sensing and recording the relative movement between the vehicle and wheel during a shock absorber testing operation in accordance with the present invention, and FIG. 5 is a graphic representation of shock absorber performance characteristics as determined by the testing apparatus of the present invention.

DETAILED DESCRIPTION OF A PREFERRED EMBODIMENT

Referring now in detail to the drawings and in particular to FIG. 1, a shock absorber testing apparatus 10, in accordance with an exemplary embodiment of the present invention, is shown in operative association with an automotive vehicle 12 that is schematically illustrated herein and shown as comprising a vehicle wheel 14 rotatably mounted on one end of a suitable axle 16. The vehicle 12 is also shown as comprising a body or chassis 18 which is operatively connected to and supported on the axle 16 by means of a conventional suspension spring 20 and shock absorber assembly, generally designated 22, the latter of which extends between and is conventionally connected to the vehicle body 18 and axle 16 and the operational characteristics of which are to be ascertained by means of the testing apparatus of the present invention, as will hereinafter be described in detail.

The shock absorber testing apparatus 10 of the present invention generally comprises an elongated, generally flat or planar support structure 24 which is provided at one end thereof with a pair of rollers or castors 26 rotatably mounted on a suitable axle member 23 that is spaced sufficiently above a ground support surface, designated by the reference numeral 30, such that when the structure 24 is disposed in the operative horizontal attitude shown in FIG. 1, the castors 26 are spaced upwardly from and are therefore disengaged from the surface 30. The end of the support structure 24 opposite the castors 26 is provided with a suitable manually engageable handle or the like 32 which is adapted to be gripped by the operator for tilting the end of the structure 24 adjacent the handle 32 upwardly, resulting in the castors 26 engaging the surface 30 to permit the operator to transport or "wheel" the apparatus 10, for example, between a storage location and the location where a shock absorber testing operation is to be performed. Suitable downwardly extending support pads or feet, generally designated 34, are provided on the underside of the support structure 24 and serve as a bearing or support means for the structure 24 when the same is disposed in the operative position shown in FIG. 1.

Extending generally perpendicularly upwardly from the support structure 24 is a support column 36 which is fixedly secured at its lower end to the support structure 24 and is preferably in the form of a generally square or rectangular hollow tubular metallic member defining opposed, spaced parallel side walls 38 and 40, as illustrated. The support column 36 is adapted to operatively support an elevatable carriage assembly, generally designated 42, which comprises a suitable housing or enclosure 44 that is disposed in substantially surrounding relationship with respect to the column 36 and is provided in the interior thereof with a plurality of guide rollers, generally designated 46, which are adapted to peripherally engage the side walls 38 and 40 of the column 36 and thereby support the carriage assembly 42 for vertical adjustable movement upwardly and downwardly along the column 36, as will be apparent. Extending upwardly from the enclosure 44 is a pair of converging support yoke members 48 and 50 which extend through suitable openings (not shown) in the side walls 38, 40 and intersect interiorly of the support column 36 at an intermediate support section, generally designated by the numeral 52.

Means for raising and lowering the carriage assembly 42, and hence the wheel 14 and portion of the vehicle body 18 supported thereon, is provided by a piston and cylinder assembly, generally designated 54, which may be either hydraulically or pneumatically actuated and comprises a cylinder 56 within which a piston member 58 is reciprocally mounted, the piston member 58 being connected to the lower end of a suitable vertically disposed piston rod 60 which is engageable at its upper end with the intermediate support section 52, whereby to operatively connect the piston and cylinder assembly 54 with the carriage assembly 42. The cylinder 56 is operatively connected by means of suitable fluid conduits 62 and 64 with a suitable foot pedal operated control valve 66 which is in turn communicable with a suitable source of pressurized fluid via a conduit 68. As will be apparent to those skilled in the art, suitable action of the valve 66 by the operator properly depressing a foot actuatable pedal 70 will effect raising and lowering of the piston member 58 in the cylinder 56 and hence effect raising and lowering of the carriage assembly 42.

The shock absorber testing apparatus 10 of the present invention is provided with means for releasably supporting the carriage assembly 42 in an elevated position, as indicated by the phantom lines in FIG. 1, which means is actuatable to release the assembly 42 to permit the same to fall under the influence of gravity to a relatively lowered position during a shock absorber testing operation. Such means is provided by a manually actuatable release arm or handle 72 which is pivotably mounted at the upper end of the column 36 by means of a suitable pivot pin or shaft 74. The arm 72 is provided with a downwardly extending latch mechanism 76 having an outwardly projecting release tang 78 that is adapted to engage the underside of the support section 52 when the assembly 42 is in its elevated position, thereby supporting the assembly 42 in said position. At such time as it is desired to release the assembly 42, the outer end of the arm 72 is raised or pivoted in a counterclockwise direction in FIG. 1, whereby the tang 78 will be disengaged from the section 52 of the assembly 42, whereby to permit the assembly 42 to drop or fall downwardly.

The apparatus 10 is provided with an outwardly extending, generally horizontally disposed arm or beam member 80 which is fixedly secured at one end to the assembly 42 and is provided at the opposite end thereof with an elevating platform 82. The platform 82 is provided with upwardly projecting tire or wheel confining side wall portions 84 and is adapted to operatively support a vehicle wheel, such as the wheel 14, for movement thereof to and from an elevated position upon elevation and releasing of the carriage assembly 42 along the column 36. The support structure 24 is preferably provided with a suitable ramp means 86 which is inclined toward the elevating platform 82, whereby to permit the vehicle 12 to be driven directly to a position wherein the particular wheel thereof associated with the shock absorber to be tested may be driven directly onto the platform 82 preparatory to the testing operation and subsequently driven off therefrom upon completion of the testing operation. It will be noted that the support structure 24 is also provided with suitable resilient bumper elements 88 directly subjacent the platform 82 which are adapted to serve as a cushioning means for the elevating platform 82 and portion of the vehicle body 18 and wheel 14 supported thereon upon the fall thereof from their respective elevated positions during a shock absorber testing operation.

Generally speaking, the operational characteristics, and in particular, the compression and rebound control characteristics of the shock absorbers being tested by the apparatus 10 are ascertained by sensing and recording the relative movement between a portion of the vehicle and some preselected relatively fixed reference surface upon release and the fall thereof from the elevated position to which the wheel 14 and body 18 are elevated by means of the carriage assembly 42. The reference surface may be defined by the apparatus 10 itself, by the ground, or by any other relatively fixed or immovable object. More particularly, it will be seen that when the platform 82 is raised, due to energization of the piston and cylinder assembly 54, the suspension spring 20 associated with the shock absorber 22 being tested will be compressed to a somewhat greater extent than in its normal or lowered position supporting the vehicle body 18 on the axle 16. This is due to the fact that in an elevated position, the wheel 14 carries a somewhat greater load than it does when resting on the ground. When the platform 82 is released due to actuation of the handle or arm 72, the wheel 14 and body 18 will fall downwardly together with the platform 82 and assembly 42; however, the suspension spring 20 will act to force or eject the wheel 14 downwardly away from the body 18, which motion of the wheel 14 is resisted by the shock absorber 22 and more particularly, is resisted by the rebound control capability or effectiveness of the shock absorber 22. Once the wheel 14 has dropped downwardly to the furtherest extent possible, i.e., when the platform 82 engages the bumpers 88, the shock absorber 22 undergoes a compression stroke due to the fact that the body 18 of the vehicle 12 is still falling, after which time the vehicle body will be biased upwardly due to the action of the spring 20 which will be compressed again as the body 18 moves downwardly toward the vehicle wheel 14, thereby causing the shock absorber 22 to undergo a subsequent rebound cycle. It has been discovered that the above described relative motion between the vehicle wheel and/or body with respect to some relatively immovable reference surface may be studied and analyzed in order to determine the rebound and compression control characteristics of the shock absorber being tested, with these characteristics being compared with the characteristics of a known satisfactory shock absorber so that the testing operator can determine whether or not the rebound and compression control or effectiveness of the shock absorber being tested come within certain predetermined limits within which a satisfactory shock absorber should operate. For example, a suitable velocity sensing device and/or acceleration sensing device (accelerometer), such as is shown in FIG. 3 and as designated by the numeral 200, can be used to determine the velocity and/or acceleration of the vehicle wheel relative to the aforesaid reference surface. One satisfactory type device for sensing velocity is manufactured by Bruel and Kjaer and is identified as Model No. 4232. Such apparatus is distributed in the United States by B & K Instruments, Inc., 5111 W. 164th Street, Cleveland, Ohio. Typically, the velocity sensing device would be connected to the wheel associated with the shock absorber being tested, as by the clamping mechanism 154 in FIG. 4, and also to the aforesaid reference surface via a suitable height adjustable mechanism, whereby relative movement between the wheel and the surface will be sensed by the device which will produce either a direct graphic, digital or the like readout or an electrical signal whose characteristics can be studied and compared to reference information. In the event it is desired to study the acceleration or change in the rate of movement between the aforesaid wheel and reference surface, the electrical signal from the velocity sensing device can be integrated in a manner well known in the instrumentation art by means of an alectrical integrator, one satisfactory type of which is manufactured by the aforementioned Bruel and Kjaer company and is identified by Model No. ZR0020. Such an integrator is also available through B & K Instruments, Inc., of Cleveland, Ohio. The thus integrated signal representative of the wheel acceleration can then be studied and compared to appropriate reference information for purposes of analyzing the shock absorber performance, as above described.

FIG. 5 is a graphic illustration of the relative motion of the vehicle wheel 14 and body 18 with respect to time during a shock absorber testing operation and illustrates how the relative motion therebetween is in the form of a series of peaks, the amplitude of which may be compared with the peaks of the relative motion between a vehicle wheel and body of a vehicle provided with a shock absorber of known quality and characteristics. In particular, it will be seen that as the wheel 14 is ejected away from the body 18 by the action of the spring 20 during the initial falling of the platform 82, a first peak, which is positive, is formed which depends primarily upon the damping characteristics of the shock absorber, principally upon the rebound control thereof, in particular, the high speed rebound control, since the actual force on the wheel 14 is greater than the gravitational force on the body 18 due to the action of the spring 20. With reference to FIG. 5, the curve indicated by the dotted line 90 indicates the relative movement between the wheel 14 and body 18 when the high speed rebound characteristics of the shock absorber 22 are poor. It will be seen that at the location of peak number 1, shown graphically in FIG. 5, a shock absorber with poor or no rebound control will have a relatively large peak, (large amplitude) while a shock absorber with good rebound control will have a substantially smaller peak (small amplitude). Thus, the value of the peak is determined by the rebound control and hence the amplitude of the curve at peak number 1 provides an accurate measure of the high speed rebound control of the shock absorber 22.

The second peak produced during a testing operation, or peak number 2 shown graphically in FIG. 5 is negative, and although being influenced somewhat by the rebound control of the shock absorber 22, the second peak principally depends upon the compression characteristics thereof. As previously stated, peak number 2 occurs when the platform 82 engages the bumpers 88 while the body 18 continues to fall. If the shock absorber 22 has relatively poor compression control characteristics, the peak number 22 will be relatively greater (in a negative sense) as indicated by the curve 92 in FIG. 5; however, if the shock absorber has good compression control, the amplitude at peak number 2 will be substantially smaller.

The third peak occurring during a testing operation, i.e., peak number 3 in FIGS. 5, which is positive in direction, depends upon the low speed rebound control of the shock absorber 22, although it is influenced at least to some extent by the high speed rebound control and compression control. The third peak occurs as the body 18 moves upwardly or away from the wheel 14 due to the upward directed force exerted thereagainst by the spring 20 which is compressed as the body 18 moves downward after the platform 82 comes to rest on the bumpers 88. As again indicated by the curve 90 in FIG. 5, the low speed rebound control of the shock absorber being tested, if poor, will have a relatively large amplitude at peak number 3, and will have a somewhat smaller amplitude if the low speed rebound control of the shock absorber is satisfactory.

By way of comparison, the dotted curve indicated by the numeral 94 in FIG. 5 illustrates the relationship of the relative movement between the body 18 and wheel 14 in the absence of the shock absorber 22, or when said shock absorber has virtually no damping effect upon relative movement therebetween. It will be seen that the wheel 14 will be ejected downwardly relative to the body, thereby moving with an acceleration even greater than gravity (see the curve 96) and reaches the ground faster than if it were free falling. The vehicle body 18, on the other hand, will fall with increasing acceleration from zero to the maximum acceleration, due to the easing of the spring force as the body 18 moves downwardly toward the wheel 14. The body 18 will then oscillate with substantially constant amplitude and at the natural frequency of the spring 20. The relative movement between the wheel 14 and body 18 when a relatively stiff shock absorber, i.e., infinite damping, is utilized is depicted by the dotted line designated by the numeral 93 and illustrates that when the platform 82 is released, both the wheel 14 and body will fall with the acceleration of gravity since both of these members are like a single body due to the stiff characteristics of the shock absorber 22 which will prevent the suspension spring 20 from ejecting the wheel 14 away from the body 18.

It will be seen that when the shock absorber 22 has relatively poor rebound control, the relative movement between the body 18 and wheel 14 is such that the wheel 14 will fall in the same manner as when the wheel is free, i.e., when the shock absorber 22 has relatively poor damping control, but that the body 18 will fall and pass to zero point somewhat later than the free condition indicated by the curve 92 since after the wheel 14 reaches its lowest position, there is a compression control stroke in the shock absorber 22, i.e., as indicated at peak number 2, which gives a decrease in the frequency of oscillation of the body 18. When the compression control of the shock absorber 22 is poor, the downward movement of the wheel 14, upon release of the platform 82, will be somewhere between the stiff and free shock absorber conditions, depending upon the rebound control thereof. The solid curved line designated by the numeral 100 indicates the relative movement between the wheel 14 and body 18 for a shock absorber having satisfactory rebound and compression control characteristics and constitutes what could be called the ideal curve against which the actual wheel-body movement relation can be compared to determine the quality of the shock absorber being tested. It will be seen that the amplitude of the curve 100 is substantially smaller at each of the peaks 1, 2 and 3 relative to the curves 90 and 92 indicating poor rebound and compression control, respectively.

In order for the operator of the shock absorber testing apparatus 10 of the present invention to determine the rebound and compression control characteristics of the shock absorber 22 being tested, the apparatus 10 is preferably provided with means for providing a visual indication of the amplitude or magnitude of the peaks depicted by the relative movement of the wheel 14 with respect to the body 18 upon releasing the carriage assembly 42 and platform 82 carried thereby. This visual indication may be in the form of a graph such as is indicated in FIG. 5, or alternatively, may be in the form of an electrical signal, as will hereinafter be described. The graph or signal may then be compared by the operator with a set of ideal curves, graphs, or signals which may be properly catalogued in accordance with the size and type of shock absorbers being analyzed. While a wide variety of different types of devices may be used for sensing and recording the relative movement between the wheel 14 and body 18 during a shock absorber testing operation, two preferred devices are shown and described herein in FIGS. 3 and 4, with the device shown in FIG. 3 being adapted to provide a graphic indication of the relative movement between the wheel and body, similar to the graphic depictions shown in FIG. 5, and the device shown in FIG. 4 being adapted to provide an electrical signal proportional to the magnitude or amplitude of the peaks produced during a testing operation, as will hereinafter be described in detail.

Referring now to FIG. 3, it will be seen that the support structure 24 is provided with a sensing and recording device, generally designated 102, which consists of a clamping fixture 104 adapted to be detachably connected to the vehicle body 18, for example, to the vehicle fender or the like. The fixture 104 is adapted to be pivotably connected by means of a suitable hinge mechanism 106 to an adjustable bracket 108 that is slidable along and adjustably secured to an upwardly inclined rod or shaft 110 which is in turn connected via a suitable pivotal connection 112 to the lower end of a vertically reciprocable shaft or rod 114. The lower end of the rod 114 and connection 112 are guided for vertical reciprocal movement by means of a suitable guide arrangement consisting of a sleeve element 116 vertically slidable along a guide member 118, with the rod 114 being guided for reciprocal movement within a suitable sleeve member 120. The upper end of the rod 114 is operatively connected by suitable pivotal or hinge connections 122 and 124 with a generally horizontally disposed member 126 which is hingedly or pivotably connected at 128 to a support bracket 130. The outer end of the member 126 is adapted to operatively carry or support a suitable recording pen or the like 132 which is adapted to depict relative movement of the member 126 on a suitable recording disc or dial 134 which is adapted to be rotated at a preselected rate by means of a suitable electrical motor or the like 136 for the purpose of introducing a time factor to the graphic representation. It will be noted that the dial 134 is connected by any suitable structural means indicated at 138 to the platform 82 which assures that a predetermined dimensional relationship will be maintained between the fixture 104 and platform 82. In operation, upon release of the platform 82, the wheel 14 and portion of the vehicle body 18 supported thereon will fall in the manner hereinabove described, resulting in downward movement of the platform 82 and fixture 104. Such movement of the fixture 104 will effect simultaneous movement of the rods 110 and 114 which will in turn effect pivotal movement of the member 126, with movement of the member 126 being recorded on the dial 134 by means of the recording pen 132. This results in a graphic illustration being placed on the dial 134 of the relative displacement, velocity or acceleration of the vehicle body 18 and wheel 14 with respect to some reference surface, which graphic illustration will be comparable to the graphic illustrations of FIG. 5 and therefore may be used in determining the rebound and compression control characteristics of the shock absorber 22.

Referring now to FIG. 4, a device for producing an electrical signal in response to the relative movement between the wheel 14 and body 18 during a shock absorber testing operation is shown as comprising a rectilinear transducer mechanism, such as a potentiometer, generally designated 140, having a body 142 and a relatively movable spindle or armature 144 which is connected via a suitable adjustable bracket 146 and clamping fixture 148 to the body portion of the vehicle 12. The body 142 is adapted to be connected by means of a suitable mounting bracket 150 and pivotable connection 152 to a clamping mechanism 154 having a pair of pinion elements 156 and 158 which are engageable with the rim of the wheel 14 and are properly adjustable so as to adapt the mechanism 154 to different size wheel rims, as will be apparent. The potentiometer 140 is adapted to be communicable with a suitable electrical amplifier circuit 160 which receives electrical signals from the potentiometer 140 that are proportional to the relative movement between the vehicle body 18 and wheel 14 and which properly transforms said signals to a form where they may be communicated to an associated readout circuit 162 that may be associated with a visual readout meter 164 and/or a digital readout mechanism 166, either of which will provide a visual indication of the magnitude or amplitude of the peaks occurring during a shock absorber testing operation. The details of the electrical circuitry involved in producing the aforesaid electrical signals will be evident to those skilled in the art and therefore have been omitted herein for purposes of simplifying the instant disclosure.

In operation of the shock absorber testing apparatus 10 of the present invention, the valve 66 is properly actuated such that the carriage assembly 42 is in its lowered position, whereby the vehicle having the shock absorber to be tested may be positioned such that the wheel associated with the shock absorber is driven up the ramp 86 onto the platform 82. Thereafter, the pedal 70 is properly actuated to effect energization of the piston and cylinder assembly 54, whereby the carriage assembly 42 is biased upwardly from the solid line position to the dotted line position in FIG. 1. As hereinabove described, such upward movement of the assembly 42 will effect concomitant upward movement of the platform 82, thereby elevating the vehicle wheel carried thereon and portion of the vehicle body supported on said wheel. At such time as the carriage assembly 42 is properly elevated, the handle 72 is moved to a position wherein the tang 78 is engaged with the lower side of the support section 52, thereby positively maintaining the carriage assembly 42, platform 82 and vehicle wheel and wheel body in an elevated attitude. Thereafter, the piston and cylinder assembly 54 may be deenergized by proper actuation of the valve 66, whereby to retract the piston rod 60 to permit unobstructed fall of the assembly 42.

At such time as it is desired to perform the acutal testing operation, the handle 72 is biased in a counterclockwise direction in FIG. 1, thereby disengaging the tang 79 with the support section 52, resulting in the fall of the carriage assembly 42, platform 82 and vehicle wheel and wheel body supported thereon. During such falling of the vehicle wheel and wheel body and subsequent thereto when the vehicle body is biased upwardly due to the action of the suspension spring associated with the shock absorber being tested, the displacement, velocity and/or acceleration of the wheel and/or vehicle body with respect to some reference surface may be sensed and recorded by any suitable means, such as by either of the devices shown in FIGS. 3 and 4. The recording thus obtained may then be compared with the performance characteristics of shock absorbers which are known to have satisfactory rebound and compression control characteristics in the manner hereinabove described, whereby the operator may ascertain whether or not the shock absorber being tested has satisfactory operational characteristics or should be repaired or replaced. Upon completion of the testing operation, the vehicle may be driven off from the platform 82 via the ramp 86 preparatory to the next successive shock absorber testing operation.

While it will be apparent that the preferred embodiment illustrated herein is well calculated to fulfill the objects above stated, it will be appreciated that the present invention is susceptible to modification, variation and change without departing from the scope of the invention.

We claim:

1. In an apparatus for testing vehicular shock absorbers in situ upon a braked, parked or otherwise relatively stationary vehicle having a sprung portion supported by associated suspension springs from an unsprung portion with the unsprung portion including road contacting wheels, the apparatus comprising: a support structure adapted to be fixedly mounted relative to a reference surface; an elevatable platform supported by said structure for upward and downward movement relative to said structure and for supporting one road contacting wheel of said vehicle; ramp means supported by said structure for permitting said vehicle to be driven to a point wherein said wheel is located on said platform; means operatively connected between said platform and said support structure for elevating said platform and thereby raising said wheel and that portion of the vehicle supported thereon from a relatively non-elevated position to a relatively elevated position and simultaneously compressing the suspension spring associated with said wheel; means for permitting said platform and said elevated portions of the vehicle to fall from said elevated position to said non-elevated position whereby said elevated wheel will be ejected downwardly under the influence of the compressed spring, means for sensing the rate of movement of one of the vehicle portions with respect to said reference surface during the fall thereof for determining the operational characteristics of the associated shock absorber; and resilient means located below said platform for cushioning said fall.

2. The apparatus as set forth in claim 1 wherein said support structure has a generally flat rectangular shape which is adapted to be located at least partially beneath said one road contacting wheel.

3. The apparatus as set forth in claim 1 wherein said platform includes a surface located along one marginal edge which is located beneath and at least partially supports an outer peripheral surface of said wheel.

4. The apparatus as set forth in claim 1 wherein at least one edge of said platform is located above the elevation of said structure, and wherein said ramp means permits said wheel to traverse said elevation.

5. The apparatus as set forth in claim 1 wherein said resilient means includes at least one resilient bumper element located directly subjacent of said platform.

6. The apparatus as set forth in claim 1 wherein said platform includes at least one side wall projecting upwardly from said platform and adapted to confine said wheel.

7. The apparatus as set forth in claim 1 wherein said means for elevating said platform includes a fluid actuated piston and cylinder assembly for raising and lowering said platform.

8. The apparatus as set forth in claim 1 wherein said support structure is portable.

9. An apparatus as set forth in claim 1 wherein said sensing means includes means for determining the rate of velocity of one of the vehicle portions with respect to said reference surface during the fall thereof.

10. An apparatus as set forth in claim 1 wherein said sensing means includes means for determining the rate of acceleration of one of the vehicle portions with respect to said reference surface during the fall thereof.

11. An apparatus as set forth in claim 1 wherein said sensing means includes means for sensing the displacement of one of the vehicle portions with respect to said reference surface during the fall thereof.

12. An apparatus as set forth in claim 1 wherein said reference surface is defined by the ground.

13. An apparatus as set forth in claim 1 wherein said reference surface is defined by said support structure.

14. In the method of testing vehicular shock absorbers in situ upon a braked, parked or otherwise stationary vehicle having a sprung portion supported by associated suspension springs from an unsprung portion with the unsprung portion including road contacting wheels, the steps which include, locating an elevatable platform under one of the road contacting wheels, elevating the platform so as to exert an upwardly directed force against said one wheel of the vehicle and thereby raise said wheel and that portion of the vehicle supported thereon from a relatively non-elevated position defined by a reference surface to a relatively elevated position, permitting said platform and said elevated wheel and portion of the vehicle supported thereon to fall from said elevated position to said non-elevated position while preventing fore and aft movement of the vehicle, and sensing the rate of movement of one of the vehicle portions with respect to the reference surface during the fall thereof and thereby determining the operational characteristics of the associated shock absorber.

15. The method as set forth in claim 14 wherein said step of sensing the rate of movement consists of determining the rate of velocity of one of the vehicle portions with respect to the reference surface during the fall thereof.

16. The method as set forth in claim 14 wherein said step of sensing the rate of movement consists of determining the rate of acceleration of one of the vehicle portions with respect to the reference surface during the fall thereof.

17. The method as set forth in claim 14 which includes the step of cushioning the fall of said platform and said elevated wheel.

* * * * *